United States Patent [19]

Fontaine

[11] 3,830,332

[45] Aug. 20, 1974

[54] AUTOMATIC DOOR LOCK

[75] Inventor: John G. Fontaine, Fort Lauderdale, Fla.

[73] Assignee: Fail Safe Brake Corporation, Ft. Lauderdale, Fla.

[22] Filed: Dec. 1, 1972

[21] Appl. No.: 311,305

[52] U.S. Cl............................ 180/113, 70/257
[51] Int. Cl........................................ B60r 25/00
[58] Field of Search...... 180/111, 112, 113; 70/256, 70/257

[56] References Cited
UNITED STATES PATENTS

| | | |
|---|---|---|
| 3,029,892 | 4/1962 | Romanski............................ 180/113 |
| 3,141,517 | 7/1964 | Detloff et al........................ 180/112 |
| 3,289,782 | 12/1966 | Price.................................. 180/111 |
| 3,630,305 | 12/1971 | Kazaoka............................. 180/113 |
| 3,722,615 | 3/1973 | Okada et al........................ 180/112 |

Primary Examiner—Robert J. Spar
Assistant Examiner—Ross Weaver
Attorney, Agent, or Firm—Oltman and Flynn

[57] ABSTRACT

An automatic door lock for use in an automotive vehicle in which an electrical control system operated by power supplied from the battery of the vehicle activates an actuator which is responsive to the control system, and the actuator in turn operates a locking device for locking and unlocking a door of the vehicle.

6 Claims, 8 Drawing Figures

PATENTED AUG 20 1974 3,830,332

AUTOMATIC DOOR LOCK

BACKGROUND OF THE INVENTION

Since automotive vehicles have been in existence, various types of door locks for such vehicles have been devised. In the case of existing locks for automotive vehicles, the driver may forget to secure the lock or it could be tampered with by a person in the vehicle such that the door might come open while the vehicle is in motion. A great many children and adults have been injured by falling out of a vehicle when a door opens with the vehicle in motion. The problem is particularly acute in four-door automobiles, and millions of two-door automobiles have been purchased by parents of small children in order to reduce the hazard involved with known door locks. Many people have leaned against a door when the vehicle is on a curve and have fallen out. Many others have lost their lives due to a door springing open when a car has been involved in an accident and the passengers and/or the driver has fallen out.

A need exists for a door lock that will automatically secure itself when the vehicle is in motion and unsecure itself when the vehicle stops. An additional desired safety feature would be to make the door lock remain in the locked condition even after the vehicle stops. This would prevent criminals from reaching into windows and unlocking a door while the vehicle is stopped at crossings and elsewhere and then taking over control.

SUMMARY OF THE INVENTION

The present invention provides an automatic door lock which accomplishes the above objectives and will not in any way interfere with the driver or with the performance of the vehicle. The door lock of the invention is fully automatic, and is used in an automotive vehicle as a separate lock in addition to the latch which ordinarily holds the door of the vehicle shut when it is closed. In the automatic door lock, an electrical control system is coupled to the battery of the vehicle. An actuator is coupled to the control system and is responsive to the control system to operate a locking device which is preferably a bolt movable relative to a pocket in the door to lock and unlock the door. The control system causes the actuator to move the bolt into a locked condition when the speed of the vehicle exceeds a predetermined threshold level which may be about three miles an hour. In one condition of the control system, the bolt will remain in the locked condition until the car has slowed below the threshold level, at which time the lock will automatically release, leaving the doors free to be opened or closed in the usual manner. Preferably, the control system includes a selector which activates a holding circuit that will cause the bolt to remain in the locked condition even after the vehicle reduces speed below the threshold level such that the bolt will not move to a released or unlocked position until the vehicle is both fully stopped and the ignition switch of the vehicle is turned off.

Accordingly, it is one object of the present invention to provide an automatic lock for a door of an automotive vehicle which will automatically lock and remain locked when the speed of the vehicle exceeds a minimum threshold level.

Another object of the invention is to enable the locking device of the automatic door lock to remain locked at least until the speed of the vehicle is reduced to a point where the vehicle is substantially stopped, at which time the system will automatically unlock leaving the doors free to open or close in their usual manner so long as the vehicle is stopped.

A further object of the invention is to provide an overriding holding circuit for the automatic door lock which assures that the locking device remains locked even after the vehicle stops until the ignition switch of the vehicle has been turned off without the system losing its automatic effect.

Other objects of this invention will appear from the following description and appended claims, reference being had to the accompanying drawings forming a part of this specification wherein like reference characters designate corresponding parts in the several views.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

DETAILED DESCRIPTION

The automatic door lock of the invention includes a multiple function electronic control system 10 which is connected to the battery 12 of an automotive vehicle such as an automobile through the ignition switch 14 of the vehicle. The battery 12 and the ignition switch 14 are connected in series in a supply line 16 which is grounded at 18.

Figure 1:
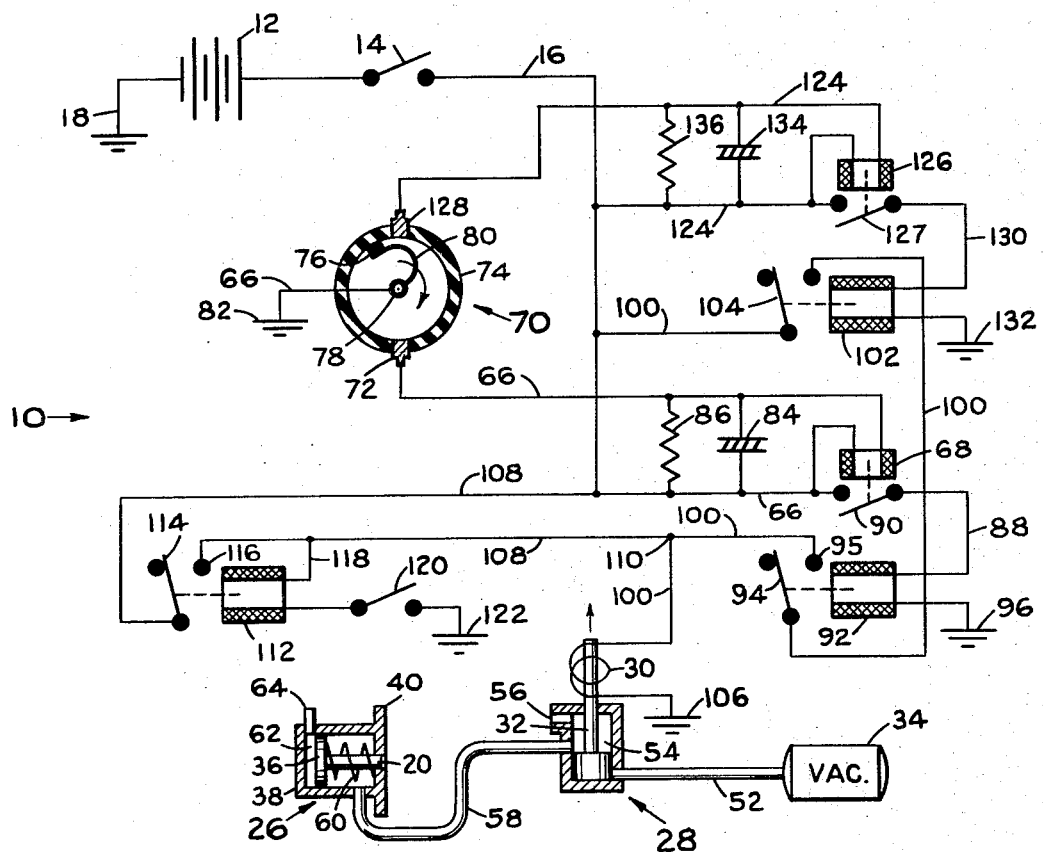
FIG. 1 is a schematic diagram of an automatic door lock in accordance with one embodiment of the invention.
Figure 3:
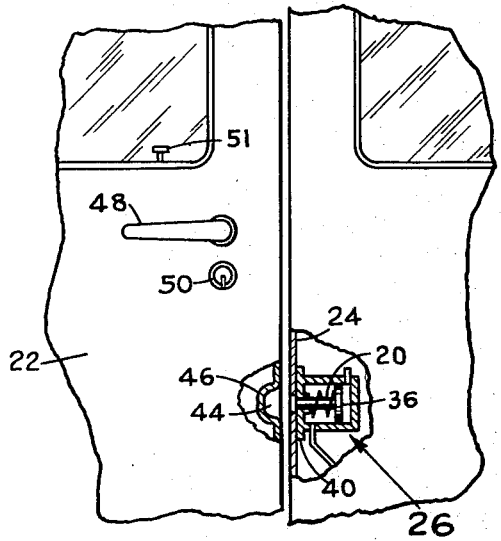
FIG. 3 is a fragmentary view of a door of a vehicle, partly broken away to show the locking device of the automatic door lock in an unlocked condition.
Figure 4:
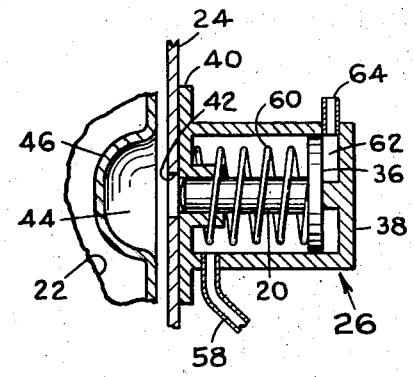
FIG. 4 is an enlarged view showing the locking device and part of the actuator included in FIG. 3.

The automatic door lock also includes a locking device in the form of a bolt 20 and a pocket 44 (FIG. 4). The bolt 20 is movable in and out of a door 22 (FIGS. 3 and 4) of a vehicle to lock and unlock the door relative to a frame 24 of the vehicle. The bolt 20 is operated by an actuator which in this embodiment consists of a piston and cylinder device 26 and a solenoid valve 28. The solenoid valve 28 has a coil 30 for controlling the plunger 32 of the valve, and the coil 30 is connected to the control system 10. Vacuum is supplied from a vacuum source 34 in the vehicle through the solenoid valve 28 to the piston and cylinder device 26. The solenoid valve 28 is normally closed as shown in FIG. 1, and may be activated to change to the open position shown in FIG. 2.

The piston and cylinder device 26 includes a piston 36 which is reciprocatively movable in a cylinder 38 to reciprocate the bolt 20 in and out of the pocket 44. The cylinder 38 has a mounting base 40 that is secured to the frame 24 of the vehicle, and the bolt 20 can extend through an opening 42 in the frame 24 into the pocket 44 which is formed by a recessed member 46 in the door 22. When the bolt is in the retracted position shown in the drawings, the door 22 is unlocked, although it may be held closed by the usual door latch (not shown) of the vehicle which is operated by the handle 48. The vehicle may also have a separate non-automatic door lock in connection with the keyhole 50 and button 51.

A conduit 52 leads from the vacuum source 34 to the chamber 54 of the solenoid valve 28. Chamber 54 is vented to the atmosphere through a vent opening 56. Another conduit 58 leads from the solenoid valve to the piston and cylinder device 26. When the solenoid valve 28 is in the condition shown in FIG. 1, the plunger 32 closes the path between lines 52 and 58.

The device 26 includes a spring 60 that urges the bolt 20 and piston 36 to the retracted position shown in the drawings. When the coil 30 of the solenoid 28 is activated, the plunger rises to the position shown in FIG. 2 so as to apply vacuum from the source 34 to the piston and cylinder device 26 on the inside of the piston 36 as viewed in the drawings. The chamber 62 of the device 26 is normally vented to the atmosphere through a vent opening 64. When vacuum is applied to the device 26, the bolt 20 extends through the opening 40 into the pocket 44 to lock the door. When the coil 30 is deactivated, the plunger 32 returns to the position shown in FIG. 1, thus removing vacuum from the device 26 so that the spring 60 urges the bolt back to the retracted position shown in FIG. 1, thus unlocking the door.

The piston and cylinder device 26 and the solenoid valve 28 constitute the actuator means for the locking device. The locking device includes the bolt 20 and the pocket 44.

The control system 10 operates the actuator means. The control system includes a first branch circuit 66 connected to the supply line 16 and also connected to the coil of a relay 68 and to an intermittent current conductor 70. The intermittent current conductor 70 is a speed responsive device which is driven through the power train of the vehicle. It includes a conducting segment 72 extending through an insulating member 74. Inside the insulating member 74, there is a rotary brush contact 76 that is rotated about a pivot 78 when the vehicle is in motion. The arm 80 is conductive. The center pivot 78 is connected by another portion of the line 66 to ground at 82.

As the brush contact 76 rotates when the vehicle is in motion, it intermittently makes contact with the conducting segment 72 to repeatedly make and break the branch circuit 66. Connected across the relay 68 are capacitor 84 and a resistor 86. When branch circuit 66 is conducting, the capacitor 84 charges. This capacitor will remain charged so long as the vehicle exceeds a predetermined minimum threshold speed which may be set at approximately three miles an hour, by way of example. To accomplish this purpose, the time delay of the resistance capacitive network 84, 86 should be approximately ⅝ second.

A second branch circuit 88 is connected to the movable contact 90 of relay 68. When the movable contact 90 is closed, branch circuit 88 is connected to the supply line 16 through a portion of the first branch circuit 66. Branch circuit 88 is connected to the coil of a relay 92 which has a movable contact 94, and branch circuit 88 is grounded at 96. Movable contact 94 is normally open, as is movable contact 90.

A third branch circuit 100 is connected to the supply line 16. It is also connected to the movable contact 104 of a relay 102 and is connected to the movable contact 94 of relay 92. Circuit 100 continues from the fixed contact 95 of relay 92 to the coil 30 of solenoid valve 28 and is grounded at 106.

A fourth branch circuit, which will be referred to herein as a holding circuit 108, is connected to the supply line 16, and is connected at its other end to terminal 110 in the third branch circuit 100. Holding circuit 108 is connected to movable contact 114 and fixed contact 116 of a relay 112. A latching path 118 branches off from circuit 108 and leads through the relay 112 and normally open switch 120 to ground at 122.

The control system 10 preferably includes further relay circuitry including a fifth branch circuit 124 connected to the supply line 16 and connected through relay 126 to another conducting segment 128 of member 74. The conducting segment 128 will be contacted by the brush contact 76 as it rotates. There is also a sixth branch circuit 130 connected to the movable contact 127 of relay 126 so that when the movable contact 127 is closed, the branch circuit 130 is connected to the supply line 16 through a portion of circuit 124. The other end of circuit 130 is connected through relay coil 102 to ground at 132.

A capacitor 134 and a resistor 136 are connected across relay 126 as shown. When the branch circuit 124 is conducting, the capacitor 134 charges and remains charged so long as the vehicle exceeds the three mile an hour threshold level referred to previously.

OPERATION

The operation of the automatic door lock will be described first in the condition where the switch 120 is open to deactivate the holding relay 112. This means that movable contact 114 remains open keeping branch circuit 108 deactivated.

A person, such as the driver, opens the door 22 and enters the vehicle closing the door bhind him. The driver closes the ignition switch 14 and starts the motor of the vehicle. The vehicle is then put into gear and goes into motion. When the vehicle reaches a speed of three miles an hour, the capacitor 84 has charged sufficiently by conduction through branch circuit 66 to energize the relay 68. Movable contact 90 then closes completing branch circuit 88 so that relay 92 also energizes to close movable contact 94.

At the same time, capacitor 134 has charged sufficiently to energize relay 126 by conduction through circuit 124. Movable contact 127 closes to complete circuit 130 causing relay 102 to be energized to close contact 104.

The closing of contacts 94 and 104 completes the third branch circuit 100 so that the coil 30 of solenoid device 28 is activated. This causes the plunger 32 to rise to the position shown in FIG. 2, thus allowing vacuum to be applied through conduits 52 and 58 to the device 26. The bolt 20 extends through the opening 40 into the pocket 44, thus locking the door 22. It may be noted that the bolt 20 in this position has a space around it since the pocket 44 is larger than the bolt 20. The operation of the bolt 20 is relatively silent.

So long as the vehicle remains in motion at a speed greater than three miles an hour, the bolt 20 will remain extended. When the vehicle is reduced in speed down below three miles an hour, the capacitors 84 and 134 will become discharged sufficiently to cause relays 68 and 126 to be deenergized. This occurs when the vehicle is just barely in motion, and it will be considered herein that the vehicle is substantially stopped at this time.

The opening of movable contacts 90 and 127 opens branch circuits 88 and 130 to deenergize relays 92 and 102. Contacts 94 and 104 then open to break the third branch circuit 100. Solenoid coil 30 is then deactivated, so the plunger 32 moves down to the position shown in FIG. 1, thus removing vacuum from the device 26. The spring 60 then returns the bolt 20 to the retracted position shown in the drawings. The door 22 is now unlocked and can be opened so long as the vehicle remains substantially stopped.

The operation which has just been described can be modified by closing the switch 120 to complete path 118. The operation of the control system will then be similar to that described above with certain changes. At the point in the sequence of operation described above when the third branch circuit 100 is completed, current will also flow through a portion of circuit 108 and holding path 118 through relay 112 and switch 120 to ground at 122. This energizes relay 112 causing movable contact 114 to close. The fourth branch circuit 108 is then completed, and relay 112 is latched in. Current is supplied through branch circuit 108 to the portion of circuit 100 which is connected directly to solenoid coil 30. Thus, once the solenoid coil 30 is energized, it will remain energized even after the vehicle stops completely. The door cannot be opened until such time as the ignition switch 14 is opened or switch 120 is opened. Therefore, it is possible for the driver of the vehicle to assure that the door 22 is locked at all times after the vehicle first starts moving whether the vehicle remains in motion or stops, so long as the ignition switch is on.

MODIFICATIONS

Figure 5:
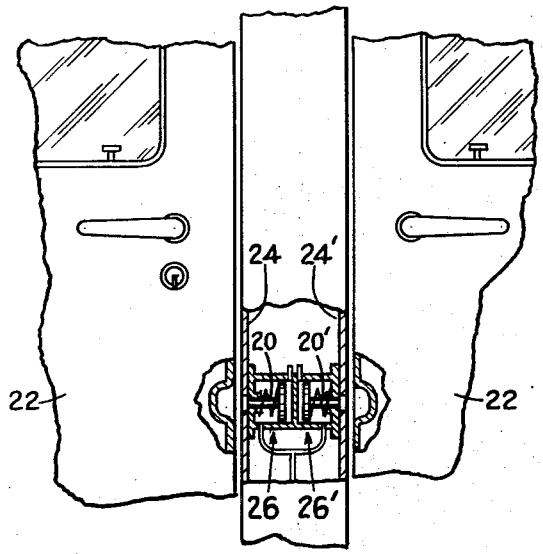
FIG. 5 is a fragmentary view of a front door and a rear door of a vehicle provided with two locking devices for the automatic door lock of the invention.
Figure 6:
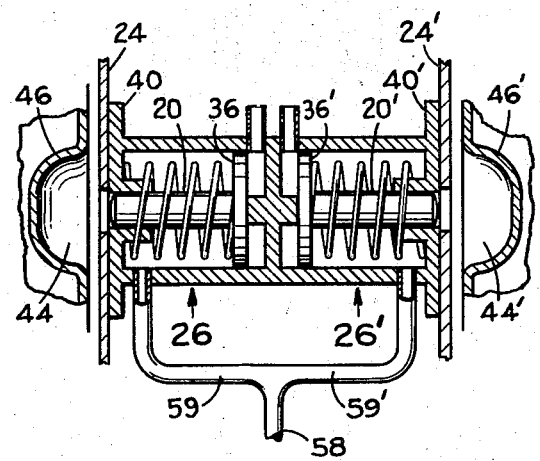
FIG. 6 is an enlarged view showing the locking devices and part of the actuators included in FIG. 5.

FIGS. 5 and 6 illustrate a modification wherein the locking device including bolt 20 and pocket 44 for the front door of the vehicle is duplicated by another locking device including bolt 20' and pocket 44' for the rear door of the vehicle. The piston and cylinder device 26 is also duplicated by an indentical piston and cylinder device 26'. The vacuum line 58 leads through branches 59 and 59' to the two devices 26 and 26'.

Figure 2:
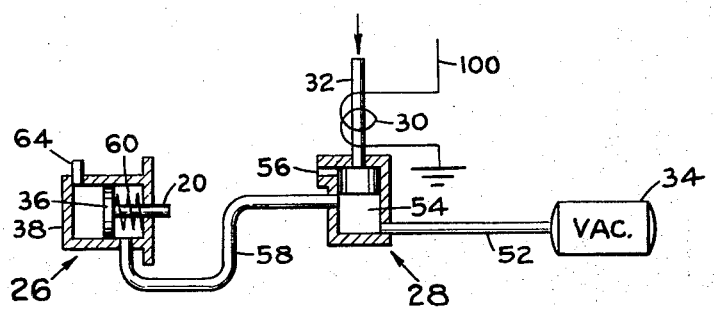
FIG. 2 is a fragmentary view of a portion of the diagram of FIG. 1 showing an actuator in a changed position.
Figure 7:
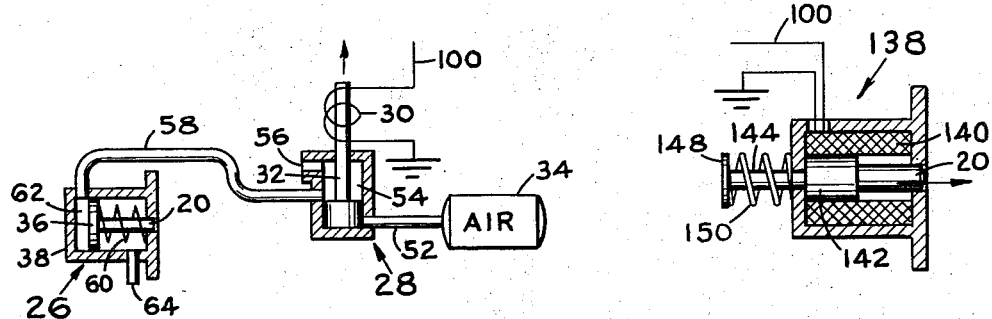
FIG. 7 is a schematic diagram of a locking device and actuator for an alternative embodiment of the invention.

FIG. 7 shows an actuator which is an alternative to the actuator shown in FIGS. 1 and 2. The bolt 20, the device 26, and the solenoid valve 28 are identical to those shown in FIGS. 1 and 2 except that the conduit 58 leads to the left side of piston 36, and the chamber 60 is vented through opening 64 on the right side of piston 36 as viewed in the drawings. In this modification, air is supplied from a compressed air source 34' through the solenoid valve 28 to the device 26. The solenoid valve 28 is normally closed as shown in FIG. 7. The coil 30 of device 28 is connected to circuit 100 in the control system 10 which operates exactly as described above. When the solenoid valve 28 is opened, air under pressure is supplied from source 34' through the valve 28 to the device 26 causing the bolt 20 to extend into the door 22 and lock the door. When the solenoid valve 28 is deactivated, air pressure is removed from device 26 so that the spring 60 returns the bolt 20 to the retracted position shown in FIG. 7.

Figure 8:
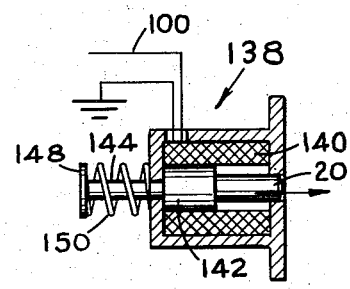
FIG. 8 is a schematic diagram of a locking device and actuator for another alternative embodiment of the invention.

FIG. 8 illustrates another modification wherein the actuator is a solenoid device 138. The bolt 20 remains the same, but it is operated directly by the coil 140 of the solenoid 138. Coil 140 is connected to circuit 100 of the control system 10 which has been described previously. The bolt 20 is connected to a plunger 142 having a shaft 144 with a flange 148 that is urged to the left by a spring 150.

When the solenoid coil 140 is energized by current flow through branch circuit 100, the plunger 142 moves to the right and the bolt 20 extends into the pocket 44 as previously described to lock the door. When the solenoid coil 140 is deenergized, the spring 150 returns the plunger and bolt to the left to the retracted position shown in FIG. 8, thus unlocking the door.

Thus, the invention provides an automatic door lock that will assure that the doors of a vehicle will not open when the vehicle is in motion. The door lock includes a bolt type lock that is operated automatically to keep the doors of the vehicle closed at all times that the vehicle is in motion. The automatic door lock may be provided with a holding circuit which will keep the door locked automatically even when the vehicle stops after once having been in motion until the ignition switch of the vehicle is opened.

It may be noted that if the vehicle stops with the brush contact 76 on either of the conducting segments 72 or 128, the solenoid coil 30 will still be deenergized because either relay 68 or 126 will be deenergized. Of course, this deenergization of coil 30 will be delayed until the ignition switch 14 is opened if the holding circuit 108 has been activated.

Having thus described my invention, I claim:

1. In an automatic door lock for use in an automotive vehicle having a battery and a door, comprising electrical control means operable by power supplied from said battery for controlling said door lock, a locking means for said door for locking and unlocking said door, and actuator means responsive to said control means for operating said locking means to lock and unlock said door, the improvement wherein said control means comprises the combination of:

a first circuit including an intermittent current conductor and a first relay having contacts, means for energizing said first relay from the battery through said intermittent current conductor when the vehicle speed is above a predetermined level, a second circuit including a second relay having contacts and a coil connected to the contacts of said first relay and said first circuit, and a third circuit connected to the contacts of said second relay and to said actuator means for operating said actuator means.

2. An automatic door lock according to claim 1, and further comprising a fourth circuit connected between said battery and said third circuit and including a holding relay for keeping said third circuit energized, said vehicle having an ignition switch for opening and closing said fourth circuit.

3. An automatic door lock according to claim 2, wherein said holding relay has a coil connected to be energized initially through the contacts of said second relay, and said holding relay has contacts which close in response to the initial energization of said last-mentioned coil to connect the battery to said actuator means and to connect the battery to said last-mentioned coil to maintain both said third circuit and said last-mentioned coil energized independent of the contacts of said second relay.

4. An automatic door lock according to claim 2, wherein said control means comprises further circuit means coupled between said battery and said intermittent current conductor and including relay means for controlling said third circuit.

5. An automatic door lock according to claim 4, and further comprising a normally-open, manually operated switch connected to the coil of said holding relay and controlling the latter's energization.

6. An automatic door lock according to claim 1, wherein said intermittent current conductor has a rotary contact and two fixed contacts that are engageable separately by said rotary contact in different rotational positions of the latter, and said first relay is connected to one of said fixed contacts to be energized in response to the latter's engagement by one of said fixed contacts, and further comprising additional relay means connected to be energized in response to the engagement of said rotary contact with the other of said fixed contacts and including normally-open relay contacts connected in said third circuit and controlling the latter's energization.

\* \* \* \* \*